Feb. 28, 1967     W. H. CAMPBELL     3,306,579
HOISTING TRUCK WITH PARALLELOGRAM
Filed July 26, 1965     2 Sheets-Sheet 1

INVENTOR.
WALTER H. CAMPBELL
BY Eugene M. Eckelman

Feb. 28, 1967   W. H. CAMPBELL   3,306,579
HOISTING TRUCK WITH PARALLELOGRAM
Filed July 26, 1965   2 Sheets-Sheet 2
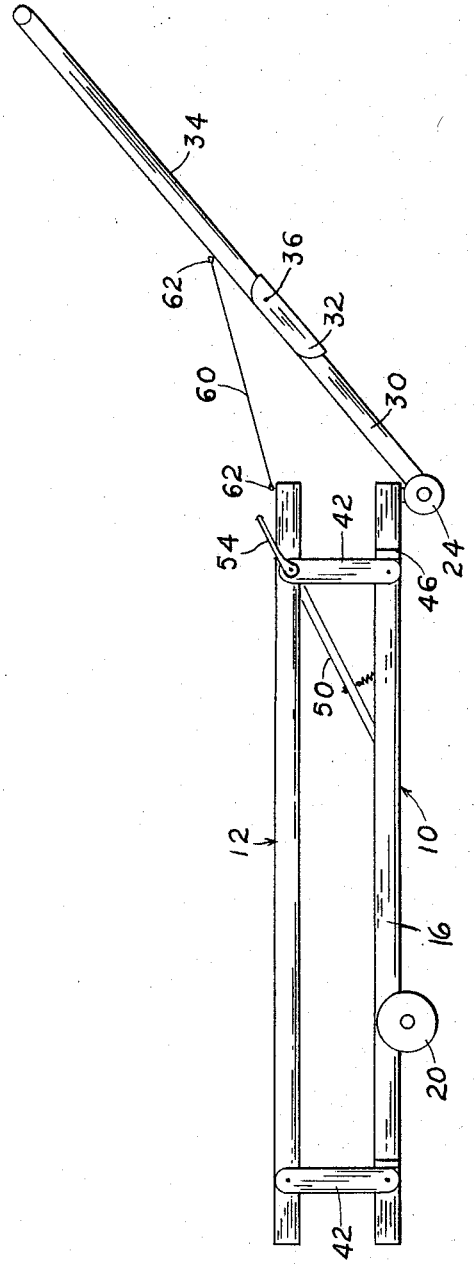
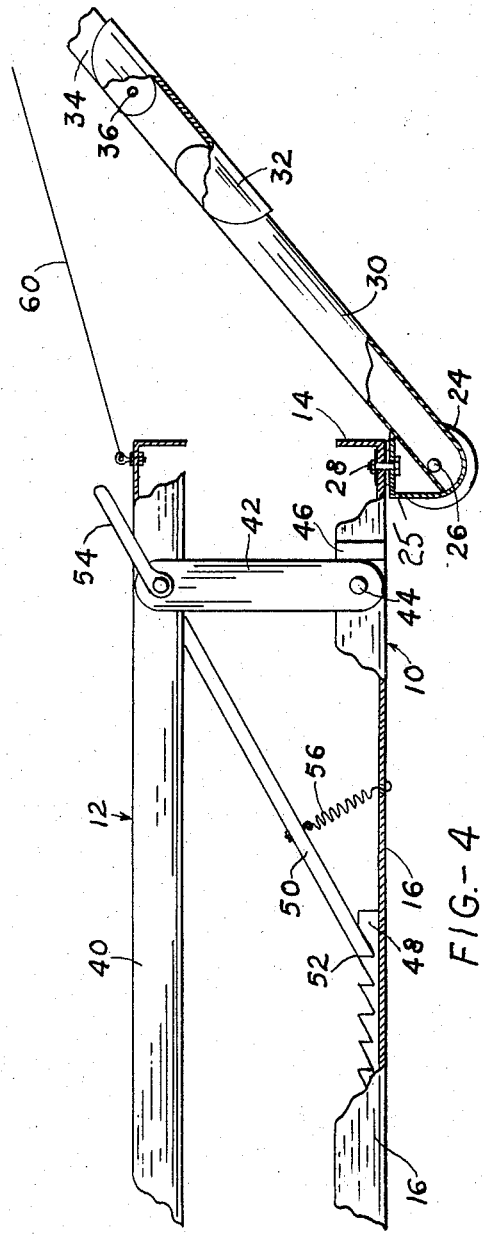
INVENTOR.
WALTER H. CAMPBELL
BY Eugene M. Eckelman

United States Patent Office 3,306,579
Patented Feb. 28, 1967

3,306,579
HOISTING TRUCK WITH PARALLELOGRAM
Walter H. Campbell, 328 NW. Strawberry Road,
Stevenson, Wash. 98648
Filed July 26, 1965, Ser. No. 474,866
1 Claim. (Cl. 254—10)

This invention relates to new and useful improvements in hand carts.

A primary objective of the present invention is to provide a hand cart which is intended particularly for home use and in its construction is light in weight and easy to operate, whereby a single person can easily move articles of furniture or the like therewith.

A more particular object is to provide a hand cart of the type described which has a simplified arrangement of lower and upper frames, the upper frame being connected to the lower frame by connecting links and being capable of movement from a lower non-use position to a raised use position.

Another object is to provide a hand cart having an upper frame which is movable vertically on link members and also having a pivoted handle assembly capable of pulling the upper frame to a raised or upper position.

Still another object is to provide a hand cart having an upper frame which is movable vertically on link members and arranged to be disposed in selected raised positions by ratchet means.

Briefly stated, the hand cart of the present invention employs a lower frame having rear wheels and steerable front wheels. Connected to this lower frame by a plurality of links is an upper frame arranged for movement with the links between a lowered non-use position and a raised use position. Raising of the upper frame to its use position is accomplished by a pivoted handle leading from the front wheel assembly and connected to the upper frame by a flexible link such as a cable or the like. Ratchet means are provided for holding the upper frame in selected raised positions.

The invention will be better understood and additional objects will become apparent from the following specification and claim, considered together with the accompanying drawings, wherein the numerals of reference indicate like parts.

In the drawings:

FIGURE 3 is a side elevational view similar to FIGURE 2 but showing the upper frame member in a raised use position; and FIGURE 4 is an enlarged fragmentary side elevational view, partly broken away showing structural details of the cart.

Figure 1:
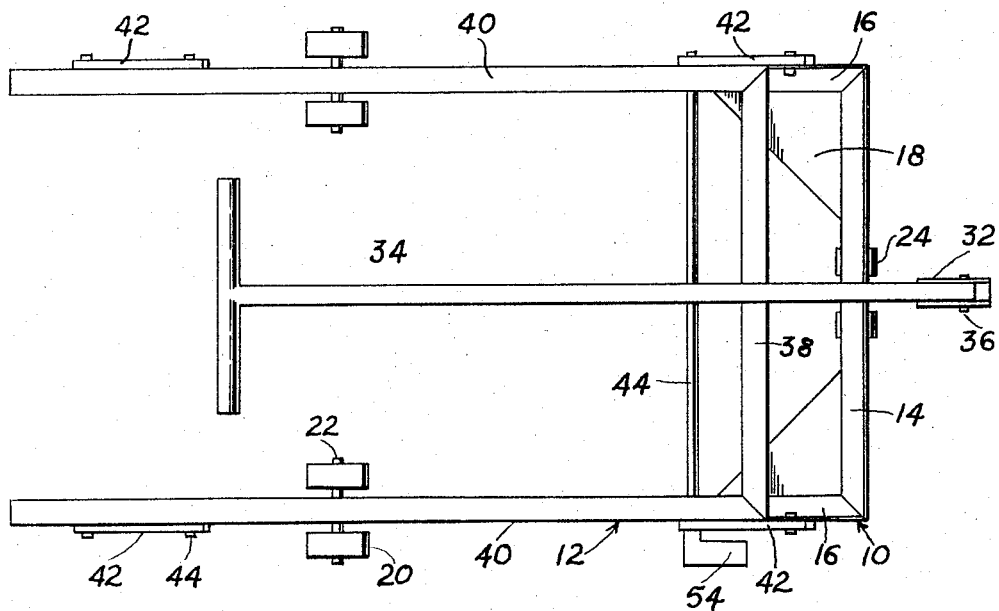
FIGURE 1 is a top plan view of the present hand cart showing the upper frame in a lowered or non-use position.

Referring in particular to the drawings, the hand cart of the present invention comprises a lower frame 10 and an upper frame 12. The lower frame 10 is composed of a front frame member 14 and a pair of rearwardly extending side frame members 16 disposed in parallel relation and at right angles to the front frame member. The rearward end of the lower frame is open. Web plates 18 are secured across the front corners of the lower frame for reinforcing said frame.

The lower frame 10 has wheeled support on pairs of rear dolly wheels 20 mounted on axles 22 secured to the side frame members 16. This frame also has a pair of centrally located front dolly wheels 24 mounted on the ends of dolly housing 25, as by means of a shaft 26. An upright spindle 28, FIGURE 4, rotatably connects the dolly housing to the front frame member 14 and provides steering movement of the front wheels.

Integrated with the dolly housing 25 is a forwardly and upwardly inclined tongue portion 30 which has an interfitted and integrated connection, as by welding, with one end of an upwardly opening channel-type connector 32. Pivotally attached to the other end of the connector 32 is a handle 34, the lower portion of the handle being interfitted in the connector 32 and having its pivotal attachment thereto by means of a pivot pin 36 extending through the connector 32 and said lower portion of the handle.

The upper frame 12 is of similar shape to the lower frame 10, having a front frame member 38 and side frame members 40 extending rearwardly at right angles thereto. Similar to the lower frame, the rearward end of the upper frame is open. In a preferred construction, the frame members of the upper and lower frames 10 and 12, respectivelly, comprise angle irons to form a rugged construction. Furthermore, it is preferred that these frame members, together with other parts of the cart, such as the handle, be formed of a lightweight metal such as aluminum so that the cart can be readily handled by a single person and also easily stored.

Figure 2:
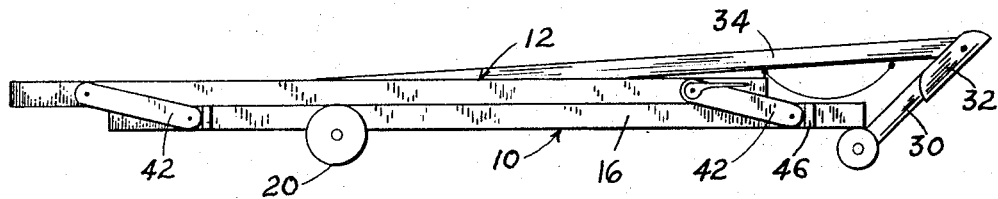
FIGURE 2 is a side elevational view of the hand cart in the position of FIGURE 1.

The upper frame 12 is connected to the lower frame 10 by four side links 42 disposed adjacent the front and rear. These links are pivotally connected to the frame members by pivot pins 44 with the exception of the upper connections of the front links with the upper frame, in which case said connections are accomplished by a cross shaft 44, FIGURE 1, the purpose of which will be described hereinafter. By means of the connecting links 42, the upper frame 12 may be swung rearwardly to a lowered position in engagement with the lower frame, as seen in FIGURES 1 and 2, or it may be moved forwardly to a raised position as seen in FIGURES 3 and 4. To limit the forward raised position of the upper frame, stop blocks 46 are secured to the side frame members 16 of the lower frame in a selected position whereby to be engaged by the forward edges of the links when the latter are substantially vertically disposed.

The upper frame 12 is arranged to be held in selected upper or raised positions by means of a ratchet mechanism comprising a toothed bar 48 secured longitudinally on one of the side frame members 16 of the lower frame. Engageable with the toothed bar 48 is a lever 50 one end 52 of which is engageable with said teeth. The other end of the lever 50 is secured integrally to the cross shaft 44 whereby upon rotation of the shaft the lever 50 rotates therewith. As best seen in FIGURES 1 and 4, the shaft 44 projects beyond one end of the upper frame and has an operating handle 54 secured to the projecting end. Lever 50 is urged downwardly by a tension spring 56 interconnected between the lever 50 and a side frame member 16 of the lower frame.

Interconnected between the upper frame 12 and the handle 34 is a flexible link 60 such as a cable or line. For securing the flexible link 60 to the frame and handle, these latter members are provided with eye bolts 62 or any other suitable fastening means. The flexible link 60 is of selected length such that when the handle 34 is pivoted outwardly to a position substantially parallel with the tongue portion 30 the frame 12 will have been pulled up and moved to its forwardmost limit position. As the frame 12 moves forwardly and upwardly the end 52 of the lever 50 will ride over and catch behind the teeth of ratchet bar 48 to restrict the rearward downward travel of the frame 12. When it is desired to release the lever 50 from the toothed ratchet bar, the operating handle 54 is rotated clockwise. If necessary, release of the lever 50 may be accomplished by first pulling down on the handle 34 to take the weight off the ratchet bar and then rotating the handle 54.

In the use of the present hand cart, the upper frame 12 is moved to its lowermost position and then the hand cart maneuvered under the article of furniture or the like which is to be moved. Since the rear portion of the cart is open it may be moved under an article of furniture in straddling relation to a supporting leg or the like. When the cart is in place under the article, the handle is pulled forwardly to raise the upper frame 12 and consequently raise the said article. As the frame 12 raises, the lever 50 rides over the ratchet bar 48, and it is apparent that the said frame 12 may be raised any selected amount between its upper and lower limits, the lever 50 maintaining it in the selected position. After moving the article to its desired location, the lever 50 is released by rotating the handle 54.

It is to be understood that the form of my invention herein shown and described is to be taken as a preferred example of the same and that various changes in the shape, size and arrangement of parts may be resorted to without departing from the spirit of my invention or the scope of the subjoined claim.

Having thus described my invention, I claim:

A hand cart comprising a lower frame, rear wheels on said lower frame, a steerable front wheel assembly on said lower frame, an upwardly and forwardly angled tongue integrated with said front wheel assembly, a pulling handle connected pivotally to the upper end of said tongue and arranged for pivotal movement outwardly away from said frame and inwardly toward said frame, an upper frame parallel with said lower frame, rear link means connecting said upper frame to said lower frame at the rearward end thereof, forward link means, a rotatable cross shaft pivotally connecting said upper frame to said lower frame at the forward end thereof, said upper frame having movement on said links in parallel relation to said lower frame between a lowered position adjacent said lower frame and upper positions spaced thereabove, flexible link means connected directly between said handle and said upper frame and arranged to move said upper frame to its upper positions upon outward pivotal movement of said handle on said tongue, stop means on said lower frame limiting pivotal movement of said upper frame in an upper position thereof, a toothed bar on said lower frame, a spring pressed lever having one end secured to said cross shaft for rotation therewith, the other end of said lever being arranged for engagement with said toothed bar for holding said upper frame in a selected upper position thereof, and an operating handle on said cross shaft for rotating said lever to disengage the latter from said toothed bar.

References Cited by the Examiner

UNITED STATES PATENTS

| | | | |
|---|---|---|---|
| 332,626 | 12/1885 | Stuck | 254—108 X |
| 554,386 | 2/1896 | Wiswell | 254—10 |
| 623,669 | 4/1899 | Hopper et al. | 254—10 |
| 711,098 | 10/1902 | Carr. | |
| 1,138,337 | 5/1915 | Whalley | 254—10 |
| 1,308,750 | 7/1919 | Barrett | 254—8 |
| 1,410,569 | 3/1922 | Hilton | 254—108 |
| 2,152,946 | 4/1939 | Barltrop | 254—10 |
| 2,840,346 | 6/1958 | Du Moulin | 254—8 |
| 2,959,311 | 11/1960 | Rosenow | 214—512 |
| 3,129,923 | 4/1964 | Kikuchi | 254—10 |

FOREIGN PATENTS 1,035,878  8/1958  Germany.

WILLIAM FELDMAN, *Primary Examiner.*

MILTON S. MEHR, *Examiner.*